United States Patent [19]

Schnack et al.

[11] Patent Number: 4,763,640

[45] Date of Patent: Aug. 16, 1988

[54] BARBECUE GRILL ASH COLLECTOR

[76] Inventors: J. Jay Schnack, 32 Las Vegas Rd., Orinda, Calif. 94563; Mark D. Wilson, 2745 Acacia Rd., Walnut Creek, Calif. 94595

[21] Appl. No.: 79,739

[22] Filed: Jul. 29, 1987

[51] Int. Cl.⁴ .............................................. F23J 1/00
[52] U.S. Cl. .................. 126/243; 126/25 R; 126/245; 126/9 B
[58] Field of Search ................. 126/25 R, 25 A, 245, 126/9 B, 30, 243, 242; 107/332, 334; 110/166

[56] References Cited

U.S. PATENT DOCUMENTS

| 101,177 | 3/1870 | Stevenson | 126/245 |
|---|---|---|---|
| 422,899 | 3/1890 | Adams et al. | 126/30 |
| 616,651 | 12/1898 | Bond | 126/245 |
| 2,120,683 | 6/1938 | Simmons | 126/25 R |
| 2,154,165 | 4/1939 | Huntington | 126/25 R |
| 2,530,166 | 11/1950 | Johannsen | 126/25 R |
| 3,455,291 | 7/1969 | Glass | 126/25 R X |
| 4,337,751 | 7/1982 | Sampson et al. | 126/25 R |
| 4,510,916 | 4/1985 | Ogden | |
| 4,628,901 | 12/1986 | Poulos | 126/25 R X |

FOREIGN PATENT DOCUMENTS 1971 of 1927 Australia ............................. 126/245

2417964 10/1979 France ............................. 126/25 R

OTHER PUBLICATIONS

Assembly Instructions for Weber Grill.

*Primary Examiner*—Samuel Scott
*Assistant Examiner*—Carl D. Price
*Attorney, Agent, or Firm*—Townsend and Townsend

[57] ABSTRACT

A removable ash collector is for use with barbecue grills having a central ash discharge opening, the grill being supported by outwardly and downwardly extending legs. The ash collector includes a conical support ring, having a downwardly and inwardly sloping inner surface, and a catch basin removably mounted beneath the support ring. The support ring has J-shaped slots in its upper edge by which the ring is mounted to the legs. The support ring acts as a guide for ashes discharged from the ash discharge opening and as the support element for the ash catch basin. The catch basin has a number of generally L-shaped hooks extending from its upper rim which engage appropriately shaped hook supports mounted to the support ring. This permits a catch basin filled with ashes to be removed without the mess or bother associated with conventional ash catchers of the type mounted directly to the legs.

1 Claim, 1 Drawing Sheet

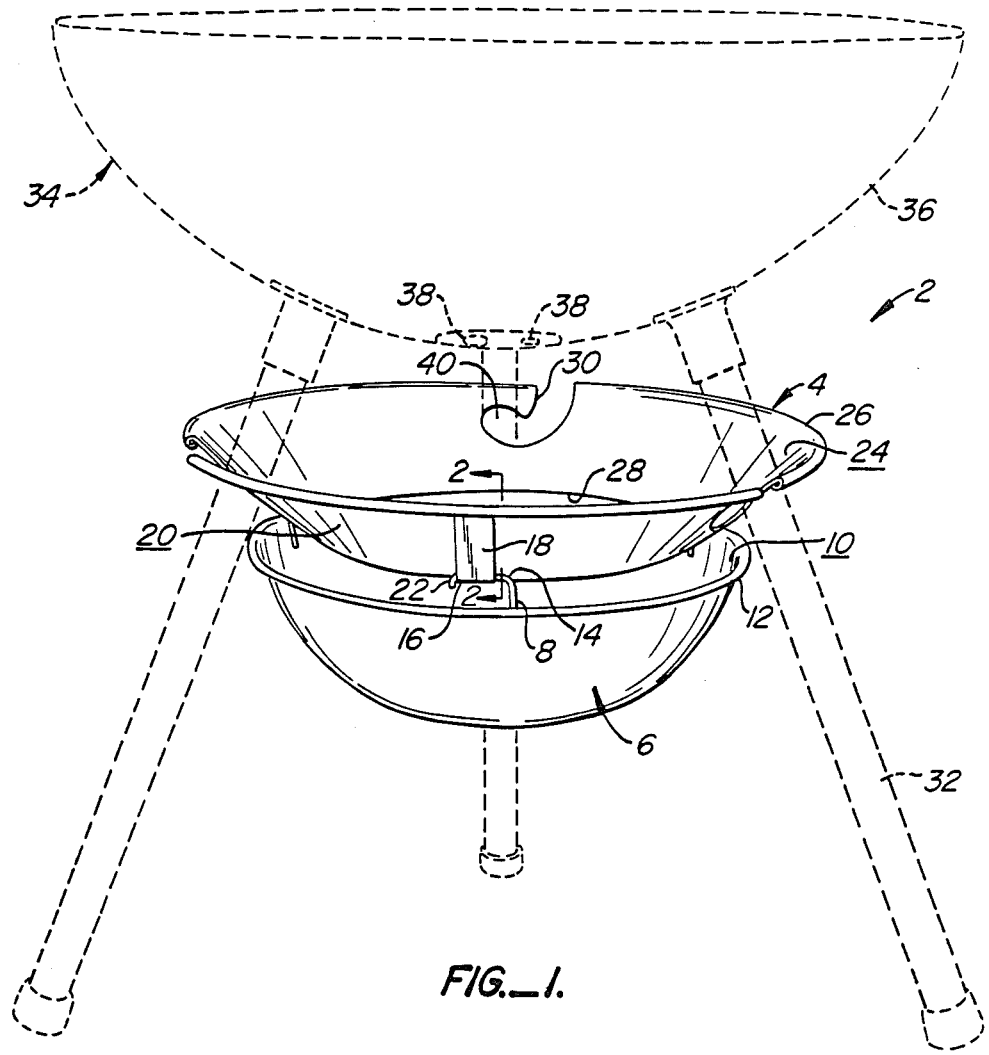
FIG.—1.
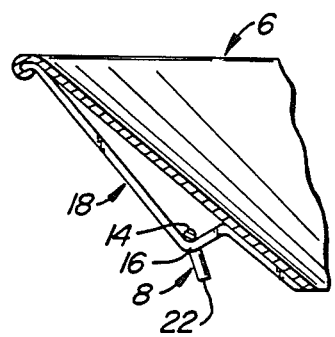
FIG.—2.

BARBECUE GRILL ASH COLLECTOR

BACKGROUND OF THE INVENTION

Kettle-shaped barbecue grills have become quite popular. The generally hemispherical kettle is supported by a number of legs, typically three, extending from the bottom of the kettle. These barbecue grills often have at least one sealable ash discharge opening in the kettle bottom. Ashes can be removed from the grill by opening the ash discharge opening and directing the ashes through the opening into an underlying ash catcher. The ash catcher, in one prior art design, is a shallow tray having J-shaped cutouts along its outer perimeter for engaging the legs of the grill. One of the problems with this arrangement is that removing an ash catcher filled with ashes can be quite tricky because of the method by which the ash catcher is mounted to the legs of the grill. Ashes can be easily spilled during the lifting and twisting action required to disengage the ash catcher from the legs. Also, periodic removal and replacement of the ash catcher can cause the ash collector to twist and bend in the regions defining the cutouts to hinder or prevent removing and remounting the ash catcher to the legs.

SUMMARY OF THE INVENTION

The present invention is directed to a removable ash collector for barbecue grills of the type having a lower ash discharge opening. The present invention makes the removal of a filled ash catch basin easy and convenient to reduce the risk of scattering ashes.

The ash collector includes a support ring having a downwardly and inwardly sloping inner surface extending from an upper, outer perimeter to a lower, inner perimeter. The support ring both acts as a guide for ashes discharged from the ash discharge opening(s) of the grill and as the support element for easily and quickly removing and replacing an ash catch basin to and from the support ring. The catch basin has, in the preferred embodiment, a number of generally L-shaped hooks extending from its upper rim which engage appropriately shaped hook supports on the support ring. In this way the container holding the ashes, that is the ash catch basin, can be suspended from the support ring in a manner which permits the ashes to be removed without the mess or bother associated with conventional ash catchers which are mounted directly to the legs. In addition, such structure eliminates damage to the ash catcher caused by the necessary periodic removal and replacement of the ash catcher from and to the legs.

The main advantage of the invention is that it permits the user to remove a filled ash catch basin from beneath the barbecue grill while substantially eliminating any propensity to spill the ashes from the catch basin while doing so. This is in large part due to the recognition that mounting structures which are appropriate for mounting an ash catcher directly to the outwardly angled legs of a kettle barbecue grill do not make it easy to disengage the ash catcher from the legs. Part of the contribution to the art this invention makes is the recognition that if one were to make the ash catcher a two-component structure, one being a support element mounted to the legs, and thus having leg-engaging elements suited for that task, and another being an ash catch basin, the catch basin and support element can be secured to one another in a manner which permits simple, smooth and easy engagement and disengagement to substantially eliminate any propensity to spill ashes while removing catch basin from the barbecue grill.

Other features and advantages of the invention will appear from the following description in which the preferred embodiment has been set forth in detail in conjunction with the accompanying drawings.

BRIEF DESCRIPTION OF THE DRAWINGS

FIG. 1 is a perspective view of an ash collector of the invention mounted to a kettle barbecue grill.

FIG. 2 is a partial cross-sectional view taken along line 2—2 of FIG. 1.

DETAILED DESCRIPTION OF THE PREFERRED EMBODIMENT

Referring now to the figures, ash collector 2 is seen to include a support ring 4 to which an ash catch basin 6 is removably suspended. Catch basin 6 has three generally L-shaped hooks 8 secured, typically spot welded, to the interior surface 10 of catch basin 6 around rim 12. Horizontal leg 14 of hook 8 engages the intersection 16 of the legs of an L-shaped strap 18 mounted to the exterior surface 20 of ring 4 at positions for engagement with hooks 8. Legs 14 have downwardly turned tips 22 to help keep catch basin 6 from being inadvertently removed from support ring 4.

Support ring 4 has a downwardly and inwardly tapering inner surface 24 extending from an upper, outer perimeter 26 to a lower, inner perimeter 28. Three J-shaped slots 30 are formed in support ring 4 at outer perimeter 26 to allow support ring 4 to be removably secured to and supported by the outwardly and downwardly extending legs 32 of a barbecue grill 34. Grill 34 has a semi-spherical bowl or kettle 36 with three ash discharge openings 38 located generally centrally between legs 32.

In use, support ring 4 is mounted to legs 32 by inserting legs 32 into J-shaped openings 30. This is accomplished by lifting ring 4 until legs 32 enter slots 30 and then moving ring 4 in a combined twisting and lowering motion so that legs 32 are seated at the ends 40 of slots 30. Ash catch basin 6 is then positioned centrally immediately beneath support ring 4 and and is rotated until its horizontal legs 14 of hooks 8 are positioned between L-shaped straps 18 and external surface 20. Catch basin 6 is then lowered to suspend the catch basin from support ring 4 through the engagement of hooks 8 and straps 18. Ash is is removed from bowl 36 through ash discharge opening 38 where it falls through ring 4 and into catch basin 6. Inner surface 24 of ring 4 helps to guide ash and other debris into catch basin 6.

To remove catch basin 6 from support ring 4, the user simply places one hand centrally beneath catch basin 6, lifts catch basin slightly, which raises horizontal legs 14 off of L-shaped straps 18, and then rotates catch basin 6 until L-shaped hooks 8 are no longer within L-shaped straps 18. Once disengaged, ash catch basin 6 is lowered away from support ring 4. The contents of ash catch basin 6 are disposed of; catch basin 6, now empty, is again mounted to support ring 4. Due to the configuration of hooks 8 and straps 18, jarring, disruptive movements, which can accompany the removal of support ring 4 from legs 32, are not encountered. Thus, the invention allows the user to simply and cleanly dispose of ash and other debris.

Modification and variation can be made to the disclosed embodiment without departing from the subject of the invention as defined in the following claims. For example, L-shaped hooks 8 and L-shaped straps 18 could be replaced by appropriately configured pins and U-shaped or J-shaped support elements. Other support element configurations for mounting support ring 4 to legs 32 and catch basin 6 to support ring 4 can be used as well. Although the invention is shown used with a grill 34 having three legs 32 and three openings 38, the invention is not so limited.

We claim:

1. A removable ash collector, for a barbecue grill of the type supported by at least three legs and having a lower ash discharge opening, comprising:

a support ring having a central opening and an outer perimeter;

the support ring including means for attaching the support ring to the legs so the support ring is spaced-apart from the barbecue grill with the central opening beneath the barbecue grill;

a catch basin;

means for removably mounting the catch basin to the support ring so the catch basin is spaced apart from the support ring beneath the central opening so that ashes discharged from the barbecue grill through the ash discharge opening pass through the central opening in the support ring and into the catch basin; and the removably mounting means including means for removing the catch basin from the support ring by lifting and twisting the catch basin relative to the support ring.

* * * * *